(12) United States Patent
Wang et al.

(10) Patent No.: US 10,158,980 B2
(45) Date of Patent: Dec. 18, 2018

(54) METHOD, DEVICE AND SYSTEM FOR MAINTAINING CONTINUITY OF GROUP COMMUNICATION SERVICE

(71) Applicant: CHINA ACADEMY OF TELECOMMUNICATIONS TECHNOLOGY, Beijing (CN)

(72) Inventors: Ying Wang, Beijing (CN); Jianhua Liu, Beijing (CN); Yali Zhao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 159 days.

(21) Appl. No.: 15/105,644

(22) PCT Filed: Dec. 24, 2014

(86) PCT No.: PCT/CN2014/094744
§ 371 (c)(1),
(2) Date: Jun. 17, 2016

(87) PCT Pub. No.: WO2015/096718
PCT Pub. Date: Jul. 2, 2015

(65) Prior Publication Data
US 2016/0323719 A1    Nov. 3, 2016

(30) Foreign Application Priority Data

Dec. 25, 2013    (CN) .......................... 2013 1 0728776

(51) Int. Cl.
*H04L 29/06*    (2006.01)
*H04W 4/08*    (2009.01)
(Continued)

(52) U.S. Cl.
CPC ......... *H04W 4/08* (2013.01); *H04W 56/0015* (2013.01); *H04W 72/042* (2013.01);
(Continued)

(58) Field of Classification Search
None
See application file for complete search history.

(56) References Cited

U.S. PATENT DOCUMENTS

2011/0083153 A1*  4/2011  Cedervall ........... H04L 65/4076
                                                     725/88
2013/0294321 A1* 11/2013  Wang ...................... H04W 4/06
                                                     370/312
2015/0200965 A1*  7/2015  Jerichow ................. H04L 63/20
                                                     726/1

FOREIGN PATENT DOCUMENTS

CN         101043252 A       9/2007
CN         101163260 A       4/2008
(Continued)

OTHER PUBLICATIONS

"3rd Generation Partnership Project; Technical Specification Group Services and System Aspects; Study on architecture enhancements to support Group Communication System Enablers for LTE (GCSE_LTE) (Release 12)", 3GPP Standard; 3GPP TR 23.768, 3rd Generation Partnership Project (3GPP), Mobile Competence Centre ; 650, Route Des Lucioles ; F-06921 Sophia-Antipolis Cedex; France, vol. SA WG2, No. V1.0.0, Dec. 5, 2013 (Dec. 5, 2013), pp. 1-54, XP050728678, [retrieved on Dec. 5, 2013].
(Continued)

*Primary Examiner* — Ayanah George
(74) *Attorney, Agent, or Firm* — Kilpatrick Townsend & Stockton LLP

(57) ABSTRACT

Disclosed are a method, device and system for maintaining the continuity of a group communication service, for solving the problem in the prior art that the service continuity
(Continued)

A GCSE-AS notifies a terminal served by the GCSE-AS that the GCSE-AS is going to switch the group communication service from multicast transmission to unicast transmission, upon determining that the group communication service needs to be switched from multicast transmission to unicast transmission — 21

The GCSE-AS transmits the group communication service over a unicast bearer for unicast transmission, which has been set up by the terminal, and stops the group communication service from being transmitted in the multicast mode, upon reception of a first notification message sent by the terminal — 22 requirement of group communication may not be satisfied due to the switching of network service from multicast transmission to unicast transmission in an MBSFN domain. The method comprises: when determining that group communication service needs to be switched from multicast transmission to unicast transmission, a GCSE-AS notifies a terminal served by the GCSE-AS that the GCSE-AS is going to switch the group communication service from multicast transmission to unicast transmission; and after receiving a first notification message transmitted by the terminal, the GCSE-AS transmits the group communication service over a unicast carrier established by the terminal for unicast transmission, and stops transmitting the communication service in multicast mode. The terminal has already established a unicast carrier for unicast transmission before the GCSE-AS switches the group communication service from multicast transmission to unicast transmission, thus ensuring the continuity of the group communication service.

18 Claims, 6 Drawing Sheets

(51) Int. Cl.
*H04W 56/00* (2009.01)
*H04W 72/04* (2009.01)
*H04W 72/12* (2009.01)
*H04W 72/14* (2009.01)
*H04W 76/40* (2018.01)
*H04W 76/25* (2018.01)
*H04L 12/18* (2006.01)
*H04W 88/16* (2009.01)

(52) U.S. Cl.
CPC ......... *H04W 72/121* (2013.01); *H04W 72/14* (2013.01); *H04W 76/25* (2018.02); *H04W 76/40* (2018.02); *H04L 12/189* (2013.01); *H04W 88/16* (2013.01)

(56) References Cited

FOREIGN PATENT DOCUMENTS

| CN | 102448019 A | 5/2012 |
| CN | 102651852 A | 8/2012 |
| EP | 1914928 A1 | 4/2008 |
| EP | 2 066 77 A1 | 3/2009 |
| EP | 2066077 A1 * | 6/2009 ............ H04W 36/06 |

OTHER PUBLICATIONS

International Search Report of PCT/CN2014/094744.

* cited by examiner

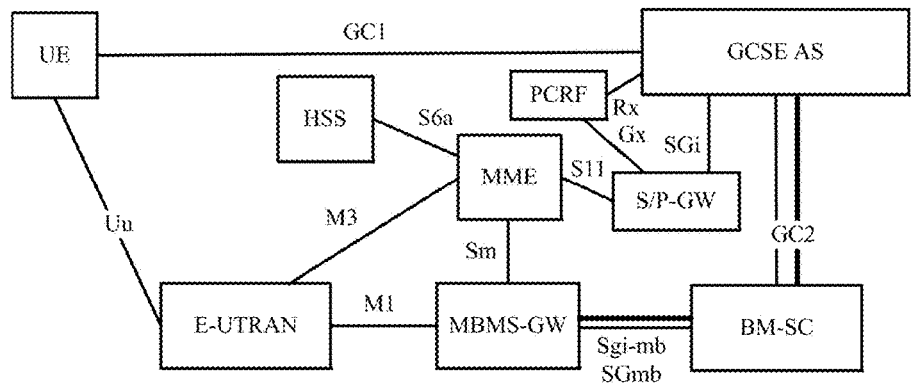

Fig.1

A GCSE-AS notifies a terminal served by the GCSE-AS that the GCSE-AS is going to switch the group communication service from multicast transmission to unicast transmission, upon determining that the group communication service needs to be switched from multicast transmission to unicast transmission ~21

The GCSE-AS transmits the group communication service over a unicast bearer for unicast transmission, which has been set up by the terminal, and stops the group communication service from being transmitted in the multicast mode, upon reception of a first notification message sent by the terminal ~22

Fig.2

METHOD, DEVICE AND SYSTEM FOR MAINTAINING CONTINUITY OF GROUP COMMUNICATION SERVICE

This application is a US National Stage of International Application No. PCT/CH2014/094744, filed on Dec. 24, 2014, designating the United States, and claiming the benefit of Chinese Patent Application No. 201310728776.0, filed with the Chinese Patent Office on Dec. 25, 2013 and entitled "Method, apparatus and system for maintaining continuity of a group communication service", which is hereby incorporated by reference in its entirety.

FIELD

The present application relates to the field of communications and particularly to a method, apparatus and system for maintaining continuity of a group communication service.

BACKGROUND

Group communication refers to a communication mode in which a network transmits service data concurrently to a number of terminals in the group, and FIG. 1 illustrates a network architecture of group communication, where respective interfaces in the network architecture function as follows:

An M3 interface is configured to provide the function of managing a session between a Mobility Management Entity (MME) and a Multi-cell/Multicast Coordination Entity (MCE), e.g., notifications of starting a session, and stopping a session, etc.;

An M2 interface is configured to provide the functions of managing a session, and transferring Multimedia Broadcast Multicast Service (MBMS) scheduling information, etc., between the MCE and an evolved Node B (eNB);

An M1 interface is configured to provide an MBMS service transmission between an MBMS Gateway (GW) and the eNB;

A GC1 interface functions as an interface between a User Equipment (UE) (or referred to as a terminal) and a Group Communication Service Enabler Application Server (GCSE AS) to define service layer signaling for related functions of the GCSE, e.g., session setup, traffic control, etc.;

A GC2 interface is configured to provide interaction between a Broadcast Multicast-Service Center (BM-SC) and the GCSE AS;

An SGi-mb interface functions as a user plane interface between the BM-SC and the MBMS GW; and An SGmb interface functions as a control plane interface between the BM-SC and the MBMS GW.

In the group communication mode, group communication terminals can be categorized by their roles in group communication into two types: transmitting terminals, which are terminals authorized by a group communication server to transmit group communication data to the group communication server, where uplink data between the transmitting terminals and the group communication server are transmitted in a unicast mode; and receiving terminals, which are authorized by the group communication server to receive group communication data issued by the group communication server, where the receiving terminals can receive group communication data from the network in a unicast or multicast mode.

For a group communication service of a Long Term Evolution (LTE) system, in a case that there are a small number of user equipments, then the network side (i.e., the GCSE-AS) can transmit a service over an LTE unicast Evolved Packet System (EPS) bearer; and in a case that there are a large number of user equipments, the network side can broadcast the group communication service over an existing MBMS network. In order to make full use of network resources, the network side can switch between multicast transmission and unicast transmission according to a preset strategy. For example, if there are a decreased number of user equipments receiving certain group communication service in a cell, then the network can switch the service from multicast transmission to unicast transmission in a related MBMS Single Frequency Network (MBSFN) domain.

However after the network switches the service from multicast transmission to unicast transmission in the related MBSFN domain, since no appropriate unicast EPS bearer has been set up for the user equipment, the network can not transmit the group communication service over any unicast EPS bearer, so that the group communication service may be interrupted for a long period of time while group communication is being switched from multicast transmission to unicast transmission, and as a result, service continuity required for group communication may not be accommodated.

SUMMARY

Embodiments of the application provide a method, apparatus and system for maintaining continuity of a group communication service so as to address the problem in the prior art that service continuity required for group communication may not be accommodated after the network switches the service from multicast transmission to unicast transmission in the related MBSFN domain.

An embodiment of the application provides a method for maintaining continuity of a group communication service, the method including:

notifying, by a GCSE AS, a terminal served by the GCSE-AS that the GCSE-AS is going to switch the group communication service from multicast transmission to unicast transmission, upon determining that the group communication service needs to be switched from multicast transmission to unicast transmission; and transmitting, by the GCSE-AS, the group communication service over a unicast bearer for unicast transmission, which has been set up by the terminal, and stopping the group communication service from being transmitted in multicast mode, upon reception of a first notification message sent by the terminal.

In the embodiment of the application, when the GCSE-AS switches the group communication service from multicast transmission to unicast transmission, the terminal has set up the unicast bearer for unicast transmission, thus guaranteeing continuity of the group communication service without modifying the existing network architecture.

In an implementation, notifying, by the GCSE-AS, the terminal that the GCSE-AS is going to switch the group communication service from multicast transmission to unicast transmission includes:

sending, by the GCSE-AS, a second notification message to a BM-SC via a GC2 interface, wherein the second notification message is configured to notify the BM-SC that the GCSE-AS is going to switch the group communication service from multicast transmission to unicast transmission.

Furthermore the method further includes:

sending, by the BM-SC, data carrying SYNC information to a base station upon reception of the second notification message, wherein the SYNC information carriers indication information indicating the GCSE-AS is going to switch the group communication service from multicast transmission to unicast transmission; or sending, by the BM-SC, a first MBMS session switching message to an MBMS gateway upon reception of the second notification message to notify the MBMS gateway that the GCSE-AS is going to switch the group communication service from multicast transmission to unicast transmission.

Preferably the first MBMS session switching message is an MBMS Session Update message carrying the indication information indicating the GCSE-AS is going to switch the group communication service from multicast transmission to unicast transmission.

Furthermore the method further includes: sending, by the MBMS gateway, a second MBMS session switching message to an MME upon reception of the first MBMS session switching message to notify the MME that the GCSE-AS is going to switch the group communication service from multicast transmission to unicast transmission.

Preferably the second MBMS session switching message is an MBMS Session Update message carrying the indication information indicating the GCSE-AS is going to switch the group communication service from multicast transmission to unicast transmission.

Furthermore the method further includes: sending, by the MME, a third MBMS session switching message to an MCE upon reception of the second MBMS session switching message to notify the MCE that the GCSE-AS is going to switch the group communication service from multicast transmission to unicast transmission.

Preferably the third MBMS session switching message is an MBMS Session Update message carrying the indication information indicating the GCSE-AS is going to switch the group communication service from multicast transmission to unicast transmission.

Furthermore the method further includes: sending, by the MCE, a fourth MBMS session switching message to the base station upon reception of the third MBMS session switching message to notify the base station that the GCSE-AS is going to switch the group communication service from multicast transmission to unicast transmission.

Preferably the fourth MBMS session switching message is an MBMS Session Update message carrying the indication information indicating the GCSE-AS is going to switch the group communication service from multicast transmission to unicast transmission; or the fourth MBMS session switching message is an MBMS Counting Request message carrying the indication information indicating the GCSE-AS is going to switch the group communication service from multicast transmission to unicast transmission.

Further to the two notification approaches of the BM-SC, furthermore the method further includes:

notifying, by the base station, the terminal served by the base station that the GCSE-AS is going to switch the group communication service from multicast transmission to unicast transmission, upon reception of the data carrying the SYNC information, or of the fourth MBMS session switching message.

In an implementation, notifying, by the base station, the terminal that the GCSE-AS is going to switch the group communication service from multicast transmission to unicast transmission includes:

notifying, by the base station, the terminal that the GCSE-AS is going to switch the group communication service from multicast transmission to unicast transmission, in Multicast channel Scheduling Information (MSI) carrying the indication information indicating that the GCSE-AS is going to switch the group communication service from multicast transmission to unicast transmission; or notifying, by the base station, the terminal served by the base station that the GCSE-AS is going to switch the group communication service from multicast transmission to unicast transmission, over a Multicast Control Channel (MCCH) in a Radio Resource control (RRC) message carrying the indication information indicating that the GCSE-AS is going to switch the group communication service from multicast transmission to unicast transmission; or notifying, by the base station, notifies the terminal served by the base station that the GCSE-AS is going to switch the group communication service from multicast transmission to unicast transmission, over the MCCH in an MBMS Counting Request message carrying the indication information indicating that the GCSE-AS is going to switch the group communication service from multicast transmission to unicast transmission; or notifying, by the base station, the terminal that the GCSE-AS is going to switch the group communication service from multicast transmission to unicast transmission, by broadcasting a System Information Block (SIB) carrying the indication information indicating that the GCSE-AS is going to switch the group communication service from multicast transmission to unicast transmission.

Preferably the SIB is SIB 13 or SIB 15.

Based upon the same inventive idea, an embodiment of the application further provides a method for maintaining continuity of a group communication service, the method including:

triggering, by a terminal, a procedure of setting up a unicast bearer for unicast transmission, upon reception of a notification that a GCSE-AS is going to switch the group communication service from multicast transmission to unicast transmission; and sending, by the terminal, a first notification message to the GCSE-AS, and to stop the group communication service transmitted by the GCSE-AS from being received in the multicast mode, wherein the first notification message is configured to instruct the GCSE-AS to transmit the group communication service in the unicast mode.

In the embodiment of the application, when the GCSE-AS switches the group communication service from multicast transmission to unicast transmission, the terminal has set up the unicast bearer for unicast transmission, thus guaranteeing continuity of the group communication service without modifying the existing network architecture.

In an implementation, receiving, by the terminal, the notification that the GCSE-AS is going to switch the group communication service from multicast transmission to unicast transmission includes:

receiving, by the terminal, MSI sent by a base station serving the terminal, wherein the MSI carries indication information indicating that the GCSE-AS is going to switch the group communication service from multicast transmission to unicast transmission; or receiving, by the terminal, an RRC message sent by the base station serving the terminal, over the MCCH, wherein the RRC message carries the indication information indicating that the GCSE-AS is going to switch the group communication service from multicast transmission to unicast transmission; or receiving, by the terminal, an MBMS Counting Request message sent by the base station serving the terminal, over the MCCH, wherein the MBMS Counting Request message carries the indication information indicating that the GCSE-AS is going to switch the group communication service from multicast transmission to unicast transmission; or receiving, by the terminal, an SIB sent by the base station serving the terminal, over the MCCH, wherein the SIB carries the indication indicating that the GCSE-AS is going to switch the group communication service from multicast transmission to unicast transmission.

Preferably the SIB is SIB 13 or SIB 15.

Based upon the same inventive idea, an embodiment of the application further provides a GCSE-AS including:

a first processing module configured to notify a terminal served by the GCSE-AS that the GCSE-AS is going to switch a group communication service from multicast transmission to unicast transmission, upon determining that the group communication service needs to be switched from multicast transmission to unicast transmission; and a second processing module configured to transmit the group communication service over a unicast bearer for unicast transmission, which has been set up by the terminal, and to stop the group communication service from being transmitted in the multicast mode, upon reception of a first notification message sent by the terminal.

In an implementation, the first processing module is configured:

to send a second notification message to a BM-SC via a GC2 interface, wherein the second notification message is configured to notify the BM-SC that the GCSE-AS is going to switch the group communication service from multicast transmission to unicast transmission.

Based upon the same inventive idea, an embodiment of the application further provides a terminal including:

a first controlling module configured to trigger a procedure of setting up a unicast bearer for unicast transmission, upon reception of a notification that a GCSE-AS is going to switch a group communication service from multicast transmission to unicast transmission; and a second controlling module configured to send a first notification message to the GCSE-AS, and to stop the group communication service from being received in the multicast mode, wherein the first notification message is configured to instruct the GCSE-AS to transmit the group communication service in the unicast mode.

In an implementation, the first controlling module is configured:

to receive MSI sent by a base station serving the terminal, wherein the MSI carries indication information indicating that the GCSE-AS is going to switch the group communication service from multicast transmission to unicast transmission; or to receive an RRC message sent by the base station serving the terminal, over an MCCH, wherein the RRC message carries the indication information indicating that the GCSE-AS is going to switch the group communication service from multicast transmission to unicast transmission; or to receive an MBMS Counting Request message sent by the base station serving the terminal, over an MCCH, wherein the MBMS Counting Request message carries the indication information indicating that the GCSE-AS is going to switch the group communication service from multicast transmission to unicast transmission; or to receive an SIB sent by the base station serving the terminal, over an MCCH, wherein the SIB carries the indication information indicating that the GCSE-AS is going to switch the group communication service from multicast transmission to unicast transmission.

Based upon the same inventive idea, an embodiment of the application further provides a communication system including:

a GCSE-AS configured to notify a terminal served by the GCSE-AS that the GCSE-AS is going to switch a group communication service from multicast transmission to unicast transmission, upon determining that the group communication service needs to be switched from multicast transmission to unicast transmission; and to transmit the group communication service over a unicast bearer for unicast transmission, which has been set up by the terminal, and to stop the group communication service from being transmitted in the multicast mode, upon reception of a first notification message sent by the terminal; and the terminal configured to trigger a procedure of setting up the unicast bearer for unicast transmission, upon reception of the notification that the GCSE-AS is going to switch the group communication service from multicast transmission to unicast transmission; and to send a first notification message to the GCSE-AS, and to stop the group communication service transmitted by the GCSE-AS from being received in the multicast mode, wherein the first notification message is configured to instruct the GCSE-AS to transmit the group communication service in the unicast mode.

In a preferred implementation, the system further includes a BM-SC and a base station, wherein:

the GCSE-AS is further configured to send a second notification message to the BM-SC via a GC2 interface, wherein the second notification message is configured to notify the BM-SC that the GCSE-AS is going to switch the group communication service from multicast transmission to unicast transmission;

the BM-SC is configured to send data carrying SYNC information to the base station upon reception of the second notification message, wherein the SYNC information carries indication information indicating that the GCSE-AS is going to switch the group communication service from multicast transmission to unicast transmission; and the base station is configured to notify the terminal served by the base station that the GCSE-AS is going to switch the group communication service from multicast transmission to unicast transmission, upon reception of the data carrying the SYNC information.

In another preferred implementation, the system further includes a BM-SC, an MBMS gateway, an MME, an MCE, and a base station, wherein:

the GCSE-AS is further configured to send a second notification message to the BM-SC via a GC2 interface, wherein the second notification message is configured to notify the BM-SC that the GCSE-AS is going to switch the group communication service from multicast transmission to unicast transmission;

the BM-SC is configured to send a first MBMS session switching message to the MBMS gateway upon reception of the second notification message to notify the MBMS gateway that the GCSE-AS is going to switch the group communication service from multicast transmission to unicast transmission;

the MBMS gateway is configured to send a second MBMS session switching message to the MME upon reception of the first MBMS session switching message to notify the MME that the GCSE-AS is going to switch the group communication service from multicast transmission to unicast transmission;

the MME is configured to send a third MBMS session switching message to the MCE upon reception of the second MBMS session switching message to notify the MCE that the GCSE-AS is going to switch the group communication service from multicast transmission to unicast transmission;

the MCE is configured to send a fourth MBMS session switching message to the base station upon reception of the third MBMS session switching message to notify the base station that the GCSE-AS is going to switch the group communication service from multicast transmission to unicast transmission; and the base station is configured to notify the terminal served by the base station that the GCSE-AS is going to switch the group communication service from multicast transmission to unicast transmission, upon reception of the fourth MBMS session switching message.

Preferably the first MBMS session switching message is an MBMS Session Update message carrying indication information indicating that the GCSE-AS is going to switch the group communication service from multicast transmission to unicast transmission;

the second MBMS session switching message is an MBMS Session Update message carrying the indication information indicating that the GCSE-AS is going to switch the group communication service from multicast transmission to unicast transmission;

the third MBMS session switching message is an MBMS Session Update message carrying the indication information indicating that the GCSE-AS is going to switch the group communication service from multicast transmission to unicast transmission; and the fourth MBMS session switching message is an MBMS Session Update message carrying the indication information indicating that the GCSE-AS is going to switch the group communication service from multicast transmission to unicast transmission; or the fourth MBMS session switching is an MBMS Counting Request message carrying the indication information indicating the GCSE-AS is going to switch the group communication service from multicast transmission to unicast transmission.

Further to the two preferred implementations above, the base station is configured:

to notify the terminal that the GCSE-AS is going to switch the group communication service from multicast transmission to unicast transmission, in MSI carrying the indication information indicating that the GCSE-AS is going to switch the group communication service from multicast transmission to unicast transmission; or to notify the terminal served by the base station that the GCSE-AS is going to switch the group communication service from multicast transmission to unicast transmission, over an MCCH in an RRC message carrying the indication information indicating that the GCSE-AS is going to switch the group communication service from multicast transmission to unicast transmission; or to notify the terminal served by the base station that the GCSE-AS is going to switch the group communication service from multicast transmission to unicast transmission, over an MCCH in an MBMS Counting Request message carrying the indication information indicating that the GCSE-AS is going to switch the group communication service from multicast transmission to unicast transmission; or to notify the terminal served by the base station that the GCSE-AS is going to switch the group communication service from multicast transmission to unicast transmission, in an SIB carrying the indication information indicating that the GCSE-AS is going to switch the group communication service from multicast transmission to unicast transmission.

Based upon the same inventive idea, an embodiment of the application further provides a GCSE-AS including a transceiver, and at least one processor connected with the transceiver, wherein:

the processor is configured to trigger the transceiver to notify a terminal served by the GCSE-AS that the GCSE-AS is going to switch a group communication service from multicast transmission to unicast transmission, when the GCSE-AS determines that the group communication service needs to be switched from multicast transmission to unicast transmission; and the transceiver is configured to receive a first notification message sent by the terminal; and the processor is further configured to transmit the group communication service over a unicast bearer for unicast transmission, which has been set up by the terminal, and to stop the group communication service from being transmitted in the multicast mode.

Furthermore the transceiver is configured to send a second notification message to a BM-SC via a GC2 interface, wherein the second notification message is configured to notify the BM-SC that the GCSE-AS is going to switch the group communication service from multicast transmission to unicast transmission.

Based upon the same inventive idea, an embodiment of the application further provides a BM-SC including a transceiver, and at least one processor connected with the transceiver, wherein:

the transceiver is configured to receive a second notification message sent by a GCSE-AS; and the processor is configured to determine from the second notification message that the GCSE-AS is going to switch a group communication service from multicast transmission to unicast transmission, and to trigger the transceiver to send data including SYNC information to a base station, wherein the SYNC information carries indication information indicating that the GCSE-AS is going to switch the group communication service from multicast transmission to unicast transmission; or to trigger the transceiver to send a first MBMS session switching message to an MBMS gateway to notify the MBMS gateway that the GCSE-AS is going to switch the group communication service from multicast transmission to unicast transmission.

Preferably the first MBMS session switching message is an MBMS Session Update message carrying the indication information indicating the GCSE-AS is going to switch the group communication service from multicast transmission to unicast transmission.

Based upon the same inventive idea, an embodiment of the application further provides an MBMS gateway including a transceiver, and at least one processor connected with the transceiver, wherein:

the transceiver is configured to receive a first MBMS session switching message sent by a BM-SC; and the processor is configured to determine from the first MBMS session switching message that an GCSE-AS is going to switch a group communication service from multicast transmission to unicast transmission, and to trigger the transceiver to send a second MBMS session switching message to an MME to notify the MME that the GCSE-AS is going to switch the group communication service from multicast transmission to unicast transmission.

Preferably the second MBMS session switching message is an MBMS Session Update message carrying the indication information indicating the GCSE-AS is going to switch the group communication service from multicast transmission to unicast transmission.

Based upon the same inventive idea, an embodiment of the application further provides an MME including a transceiver, and at least one processor connected with the transceiver, wherein:

the transceiver is configured to receive a second MBMS session switching message sent by an MBMS gateway; and the processor is configured to determine from the second MBMS session switching message that an GCSE-AS is going to switch a group communication service from multicast transmission to unicast transmission, and to trigger the transceiver to send a third MBMS session switching message to an MCE to notify the MCE that the GCSE-AS is going to switch the group communication service from multicast transmission to unicast transmission.

Preferably the third MBMS session switching message is an MBMS Session Update message carrying the indication information indicating the GCSE-AS is going to switch the group communication service from multicast transmission to unicast transmission.

Based upon the same inventive idea, an embodiment of the application further provides an MCE including a transceiver, and at least one processor connected with the transceiver, wherein:

the transceiver configured to receive a third MBMS session switching message sent by an MME; and the processor configured to determine from the third MBMS session switching message that an GCSE-AS is going to switch a group communication service from multicast transmission to unicast transmission, and to trigger the transceiver to send a fourth MBMS session switching message to a base station to notify the base station that the GCSE-AS is going to switch the group communication service from multicast transmission to unicast transmission.

Preferably the fourth MBMS session switching message is an MBMS Session Update message carrying the indication information indicating the GCSE-AS is going to switch the group communication service from multicast transmission to unicast transmission; or the fourth MBMS session switching message is an MBMS Counting Request message carrying the indication information indicating the GCSE-AS is going to switch the group communication service from multicast transmission to unicast transmission.

Based upon the same inventive idea, an embodiment of the application further provides a base station including a transceiver, and at least one processor connected with the transceiver, wherein:

the transceiver is configured to receive data carrying SYNC information sent by a BM-SC, or to receive a fourth MBMS session switching message sent by an MCE; and the processor is configured to determine from the data carrying the SYNC information, or the fourth MBMS session switching message that a GCSE-AS is going to switch a group communication service from multicast transmission to unicast transmission, and to trigger the transceiver to notify a terminal served by the base station that the GCSE-AS is going to switch the group communication service from multicast transmission to unicast transmission.

In an implementation, the transceiver is configured:

to notify the terminal that the GCSE-AS is going to switch the group communication service from multicast transmission to unicast transmission, in MSI carrying indication information indicating that the GCSE-AS is going to switch the group communication service from multicast transmission to unicast transmission; or to notify the terminal served by the base station that the GCSE-AS is going to switch the group communication service from multicast transmission to unicast transmission, over an MCCH in an RRC message carrying the indication information indicating that the GCSE-AS is going to switch the group communication service from multicast transmission to unicast transmission; or to notify the terminal served by the base station that the GCSE-AS is going to switch the group communication service from multicast transmission to unicast transmission, over an MCCH in an MBMS Counting Request message carrying the indication information indicating that the GCSE-AS is going to switch the group communication service from multicast transmission to unicast transmission; or to notify the terminal served by the base station that the GCSE-AS is going to switch the group communication service from multicast transmission to unicast transmission, in an SIB carrying the indication information indicating that the GCSE-AS is going to switch the group communication service from multicast transmission to unicast transmission.

Preferably the SIB is SIB 13 or SIB 15.

Based upon the same inventive idea, an embodiment of the application further provides a terminal including a transceiver, and at least one processor connected with the transceiver, wherein:

the transceiver is configured to receive a notification that a GCSE-AS is going to switch a group communication service from multicast transmission to unicast transmission; and the processor is configured to trigger a procedure of setting up a unicast bearer for unicast transmission, to trigger the transceiver to send a first notification message to the GCSE-AS, and to stop the group communication service sent by the GCSE-AS from being received in the multicast mode, wherein the first notification message is configured to instruct the GCSE-AS to transmit the group communication service in the unicast mode.

Preferably the transceiver is configured:

to receive MSI sent by a base station serving the terminal, wherein the MSI carries indication information indicating that the GCSE-AS is going to switch the group communication service from multicast transmission to unicast transmission; or to receive an RRC message sent by the base station serving the terminal, over an MCCH, wherein the RRC message carries indication information indicating that the GCSE-AS is going to switch the group communication service from multicast transmission to unicast transmission; or to receive an MBMS Counting Request message sent by the base station serving the terminal, over the MCCH, wherein the MBMS Counting Request message carries the indication information indicating that the GCSE-AS is going to switch the group communication service from multicast transmission to unicast transmission; or to receive an SIB sent by the base station serving the terminal, over the MCCH, wherein the SIB carries the indication information indicating that the GCSE-AS is going to switch the group communication service from multicast transmission to unicast transmission.

BRIEF DESCRIPTION OF THE DRAWINGS

FIG. 1 is a schematic diagram of the network architecture of group communication in the prior art;

FIG. 2 is a schematic diagram of a method at the network side for maintaining continuity of a group communication service according to an embodiment of the application;

DETAILED DESCRIPTION OF THE EMBODIMENTS

Figure 3:
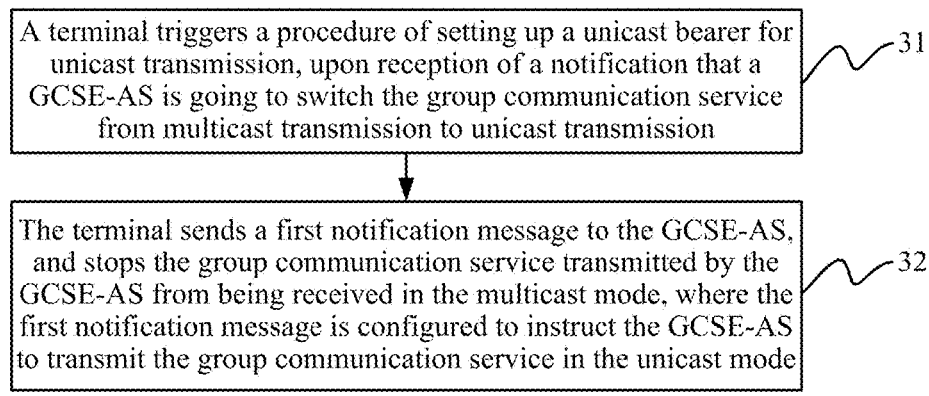
FIG. 3 is a schematic diagram of a method at the terminal side for maintaining continuity of a group communication service according to an embodiment of the application.

The embodiments of the application will be described below in further details with reference to the drawings. It shall be appreciated that the embodiments described here are merely intended to illustrate and explain the application but not to limit the application.

As illustrated in FIG. 2, a method at the network side for maintaining continuity of a group communication service according to an embodiment of the application includes the following operations:

Operation 21: a GCSE-AS notifies a terminal served by the GCSE-AS that the GCSE-AS is going to switch the group communication service from multicast transmission to unicast transmission, upon determining that the group communication service needs to be switched from multicast transmission to unicast transmission;

Operation 22: the GCSE-AS transmits the group communication service over a unicast bearer for unicast transmission, which has been set up by a terminal, and stops the group communication service from being transmitted in the multicast mode, upon reception of a first notification message sent by the terminal.

In this operation, the order in which firstly the group communication service is transmitted in the unicast mode, and then the group communication service is stopped from being transmitted in the multicast mode, or vice versa will not be limited. Particularly the GCSE-AS can firstly transmit the group communication service over the unicast bearer, and then stop the group communication service from being transmitted in the multicast mode, or can firstly stop the group communication service from being transmitted in the multicast mode, and then transmit the group communication service over the unicast bearer, upon reception of the first notification message sent by the terminal.

In the embodiment of the application, the GCSE-AS notifies the terminal served by the GCSE-AS that the GCSE-AS is going to switch the group communication service from multicast transmission to unicast transmission, upon determining that the group communication service needs to be switched from multicast transmission to unicast transmission, and the GCSE-AS transmits the group communication service over the unicast bearer for unicast transmission, which has been set up by a terminal, and stops the group communication service from being transmitted in the multicast mode, upon reception of the first notification message sent by the terminal. In the embodiment of the application, when the GCSE-AS switches the group communication service from multicast transmission to unicast transmission, the terminal has set up the unicast bearer for unicast transmission, thus guaranteeing continuity of the group communication service without modifying the existing network architecture.

In an implementation, the GCSE-AS can notify the terminal that the GCSE-AS is going to switch the group communication service from multicast transmission to unicast transmission, in different manners dependent upon different current states of the terminal, particularly as follows:

I. The terminal is in the idle state;

In the operation 21, the GCSE-AS notifies the terminal that the GCSE-AS is going to switch the group communication service from multicast transmission to unicast transmission, particularly as follows:

The GCSE-AS sends a second notification message to a BM-SC via a GC2 interface, where the second notification message is configured to notify the BM-SC that the GCSE-AS is going to switch the group communication service from multicast transmission to unicast transmission.

Furthermore the BM-SC can notify an Evolved Universal Mobile Telecommunication System (UMTS) Terrestrial Radio Access Network (E-UTRAN) side device in a user plane mechanism or a control plane mechanism that the GCSE-AS is going to switch the group communication service from multicast transmission to unicast transmission, upon reception of the second notification message.

In a first approach, the BM-SC can notify the E-UTRAN side device in the user plane mechanism that the GCSE-AS is going to switch the group communication service from multicast transmission to unicast transmission, upon reception of the second notification message, particularly as follows.

The BM-SC transmits data carrying SYNC information to a base station, where the SYNC information carries an indication information indicating that the GCSE-AS is going to switch the group communication service from multicast transmission to unicast transmission.

Preferably a reserved value of Protocol Data Unit (PDU) TYPE in the existing SYNC information (e.g., PDU TYPE=4) can be extended to indicate that the GCSE-AS is going to switch the group communication service from multicast transmission to unicast transmission as depicted in the table below:

| Bits | | | | | | | | Number of Octets | |
|---|---|---|---|---|---|---|---|---|---|
| 7 | 6 | 5 | 4 | 3 | 2 | 1 | 0 | | |
| PDU Type (=4) | | | | Spare | | | | 1 | Frame Control Part |
| Time Stamp | | | | | | | | 2 | |
| Packet Number | | | | | | | | 2 | |
| Elapsed Octet Counter | | | | | | | | 4 | |
| Total Number Of Packet | | | | | | | | 3 | |
| Total Number Of Octet | | | | | | | | 5 | |
| Header Cyclic Redundancy Check (CRC) | | | | | Padding | | | 1 | Frame Check Sum Part |

Of course, as an alternative to the approach above, indication information can be added in the existing SYNC information to indicate that the GCSE-AS is going to switch the group communication service from multicast transmission to unicast transmission.

In this approach, the base station determines that the GCSE-AS is going to switch the group communication service from multicast transmission to unicast transmission, and furthermore the base station notifies the terminal served by the base station that the GCSE-AS is going to switch the group communication service from multicast transmission to unicast transmission, upon reception of the data carrying the SYNC information.

In an implementation, the base station can notify the terminal served by the basestation that the GCSE-AS is going to switch the group communication service from multicast transmission to unicast transmission in the following several schemes:

In a first scheme, the base station notifies the terminal served by the base station that the GCSE-AS is going to switch the group communication service from multicast transmission to unicast transmission, over an MSI, where the Multicast channel Scheduling Information (MSI) carries the indication inform indicating that the GCSE-AS is going to switch the group communication service from multicast transmission to unicast transmission.

In this scheme, the base station extends the existing MSI to notify the terminal that the GCSE-AS is going to switch the group communication service from multicast transmission to unicast transmission. Particularly the base station can use a reserved value in the MSI to indicate to the terminal that the GCSE-AS is going to switch the group communication service from multicast transmission to unicast transmission.

In a second scheme, the base station notifies the terminal served by the base station that the GCSE-AS is going to switch the group communication service from multicast transmission to unicast transmission, over an MCCH in an RRC message carrying the indication information indicating that the GCSE-AS is going to switch the group communication service from multicast transmission to unicast transmission.

In this scheme, the base station notifies the terminal that the GCSE-AS is going to switch the group communication service from multicast transmission to unicast transmission, in the new RRC message.

In a third scheme, the base station notifies the terminal served by the base station that the GCSE-AS is going to switch the group communication service from multicast transmission to unicast transmission, over an MCCH in an MBMS Counting Request message carrying the indication information indicating that the GCSE-AS is going to switch the group communication service from multicast transmission to unicast transmission.

In this scheme, the base station notifies the terminal that the GCSE-AS is going to switch the group communication service from multicast transmission to unicast transmission, by extending the existing MBMS Counting Request message, that is, carrying the indication information in the MBMS Counting Request message to indicate that the GCSE-AS is going to switch the group communication service from multicast transmission to unicast transmission.

In a fourth scheme, the base station notifies the terminal that the GCSE-AS is going to switch the group communication service from multicast transmission to unicast transmission, in an SIB carrying the indication information indicating that the GCSE-AS is going to switch the group communication service from multicast transmission to unicast transmission.

In this scheme, the base station can notify the terminal that the GCSE-AS is going to switch the group communication service from multicast transmission to unicast transmission, by extending the existing SIB, that is, carrying the indication information in the existing SIB to indicate that the GCSE-AS is going to switch the group communication service from multicast transmission to unicast transmission; or can notify the terminal that the GCSE-AS is going to switch the group communication service from multicast transmission to unicast transmission, in a new SIB.

Preferably the basestation can notify the terminal that the GCSE-AS is going to switch the group communication service from multicast transmission to unicast transmission, by extending the existing SIB13 or SIB15 by carrying in the SIB13 or the SIB15 the indication information indicating that the GCSE-AS is going to switch the group communication service from multicast transmission to unicast transmission, and broadcasting the SIB 13 or the SIB 15.

It shall be noted that the base station can notify the terminal served by the base station that the GCSE-AS is going to switch the group communication service from multicast transmission to unicast transmission, in any one of the schemes above.

In a second approach, the BM-SC can notify the E-UTRAN side device in the control plane mechanism that the GCSE-AS is going to switch the group communication service from multicast transmission to unicast transmission, upon reception of the second notification message, particularly as follows.

The BM-SC sends a first MBMS session switching message to an MBMS gateway upon reception of the second notification message to notify the MBMS gateway that the GCSE-AS is going to switch the group communication service from multicast transmission to unicast transmission.

In an implementation, the first MBMS session switching message can be new signaling or can be extended existing signaling.

Preferably the first MBMS session switching message is an MBMS Session Update message carrying indication information indicating that the GCSE-AS is going to switch the group communication service from multicast transmission to unicast transmission, that is, the BM-SC extends the existing MBMS Session Update message to notify the MBMS gateway that the GCSE-AS is going to switch the group communication service from multicast transmission to unicast transmission.

Furthermore the MBMS gateway sends a second MBMS session switching message to an MME upon reception of the first MBMS session switching message to notify the MME that the GCSE-AS is going to switch the group communication service from multicast transmission to unicast transmission.

In an implementation, the second MBMS session switching message can be new signaling or extended existing signaling.

Preferably the second MBMS session switching message is an MBMS Session Update message carrying the indication information indicating that the GCSE-AS is going to switch the group communication service from multicast transmission to unicast transmission, that is, the MBMS gateway extends the existing MBMS Session Update message to notify the MME that the GCSE-AS is going to switch the group communication service from multicast transmission to unicast transmission.

Furthermore the MME sends a third MBMS session switching message to an MCE upon reception of the second MBMS session switching message to notify the MCE that the GCSE-AS is going to switch the group communication service from multicast transmission to unicast transmission.

In an implementation, the third MBMS session switching message can be new signaling or extended existing signaling.

Preferably the third MBMS session switching message is an MBMS Session Update message carrying the indication information indicating that the GCSE-AS is going to switch the group communication service from multicast transmission to unicast transmission, that is, the MME extends the existing MBMS Session Update message to notify the MCE that the GCSE-AS is going to switch the group communication service from multicast transmission to unicast transmission.

Furthermore the MCE sends a fourth MBMS session switching message to the base station upon reception of the third MBMS session switching message to notify the base station that the GCSE-AS is going to switch the group communication service from multicast transmission to unicast transmission.

In an implementation, the fourth MBMS session switching message can be new signaling or extended existing signaling.

In a preferred implementation, the fourth MBMS session switching message is an MBMS Session Update message carrying the indication information indicating that the GCSE-AS is going to switch the group communication service from multicast transmission to unicast transmission, that is, the MCE extends the existing MBMS Session Update message to notify the base station that the GCSE-AS is going to switch the group communication service from multicast transmission to unicast transmission.

In another preferred implementation, the fourth MBMS session switching message is an MBMS Counting Request carrying the indication information that the GCSE-AS is going to switch the group communication service from multicast transmission to unicast transmission, that is, the MCE extends the exiting MBMS Counting Request to notify the base station that the GCSE-AS is going to switch the group communication service from multicast transmission to unicast transmission.

Furthermore, upon reception of the fourth MBMS session switching message, the base station determines that the GCSE-AS is going to switch the group communication service from multicast transmission to unicast transmission, and the base station further notifies the terminal served by the base station that the GCSE-AS is going to switch the group communication service from multicast transmission to unicast transmission.

In an implementation, the base station can notify the terminal(s) served by the base station that the GCSE-AS is going to switch the group communication service from multicast transmission to unicast transmission, in any one of the first scheme to the fourth scheme above, and reference can be made to the description in the first approach for details thereof, so a repeated description thereof will be omitted here.

II. The terminal is in the connected state.

In a preferred implementation, the GCSE-AS can notify the terminal that the GCSE-AS is going to switch the group communication service from multicast transmission to unicast transmission, as in one of the schemes above where the terminal is in the idle state, and reference can be made to the description above for the terminal in the idle state for details thereof, so a repeated description thereof will be omitted here.

In another preferred implementation, the GCSE-AS sends a notification message directly to the terminal served by the GCSE-AS to notify the terminal that the GCSE-AS is going to switch the group communication service from multicast transmission to unicast transmission.

Based upon the same inventive idea, an embodiment of the application further provides a method at the terminal side for maintaining continuity of a group communication service, and as illustrated in FIG. 3, the method includes the following operations:

Operation 31: a terminal triggers a procedure of setting up a unicast bearer for unicast transmission, upon reception of a notification that a GCSE-AS is going to switch the group communication service from multicast transmission to unicast transmission.

In this operation, the terminal receives the group communication service over an MBMS bearer for multicast transmission, and the terminal can be currently in the idle state or the connected state; and the terminal knows that the group communication service will be switched from multicast transmission to unicast transmission, upon reception of the notification that the GCSE-AS is going to switch the group communication service from multicast transmission to unicast transmission, so the terminal triggers a procedure of setting up a unicast bearer for unicast transmission (e.g., an EPS bearer).

Operation 32: the terminal sends a first notification message to the GCSE-AS, and stops the group communication service transmitted by the GCSE-AS from being received in the multicast mode, where the first notification message is configured to instruct the GCSE-AS to transmit the group communication service in the unicast mode.

In this operation, the terminal instructs the GCSE-AS to perform unicast transmission, after setting up the unicast bearer, and thereafter the terminal stops the group communication service transmitted by the GCSE-AS from being received in the multicast mode.

In the embodiment of the application, the terminal triggers the procedure of setting up a unicast bearer for unicast transmission, upon reception of the notification that the GCSE-AS is going to switch the group communication service from multicast transmission to unicast transmission; and the terminal sends the first notification message to the GCSE-AS, and stops the group communication service transmitted by the GCSE-AS from being received in the multicast mode, where the first notification message is configured to instruct the GCSE-AS to transmit the group communication service in the unicast mode. When the GCSE-AS switches the group communication service from multicast transmission to unicast transmission, the terminal has set up the unicast bearer for unicast transmission, thus guaranteeing continuity of the group communication service.

In an implementation, in the operation 31, the terminal receives the notification that the GCSE-AS is going to switch the group communication service from multicast transmission to unicast transmission particularly as follows:

The terminal receives MSI sent by a base station serving the terminal, where the MSI carries indication information indicating that the GCSE-AS is going to switch the group communication service from multicast transmission to unicast transmission (reference can be made to the description in the first scheme above for details thereof);

Or

The terminal receives an RRC message sent by the base station serving the terminal, over an MCCH, where the RRC message carries an indication information indicating that the GCSE-AS is going to switch the group communication service from multicast transmission to unicast transmission (reference can be made to the description in the second scheme above for details thereof);

Or

The terminal receives an MBMS Counting Request message sent by the base station serving the terminal, over an MCCH, where the MBMS Counting Request message carries an indication information indicating that the GCSE-AS is going to switch the group communication service from multicast transmission to unicast transmission (reference can be made to the description in the third scheme above for details thereof);

Or

The terminal receives an SIB sent by the base station serving the terminal, over an MCCH, where the SIB carries indication information indicating that the GCSE-AS is going to switch the group communication service from multicast transmission to unicast transmission (reference can be made to the description in the fourth scheme above for details thereof).

Interactions between the respective entities in the method for maintaining continuity of a group communication service according to the application will be described below in details in two particular embodiments thereof.

Figure 4:
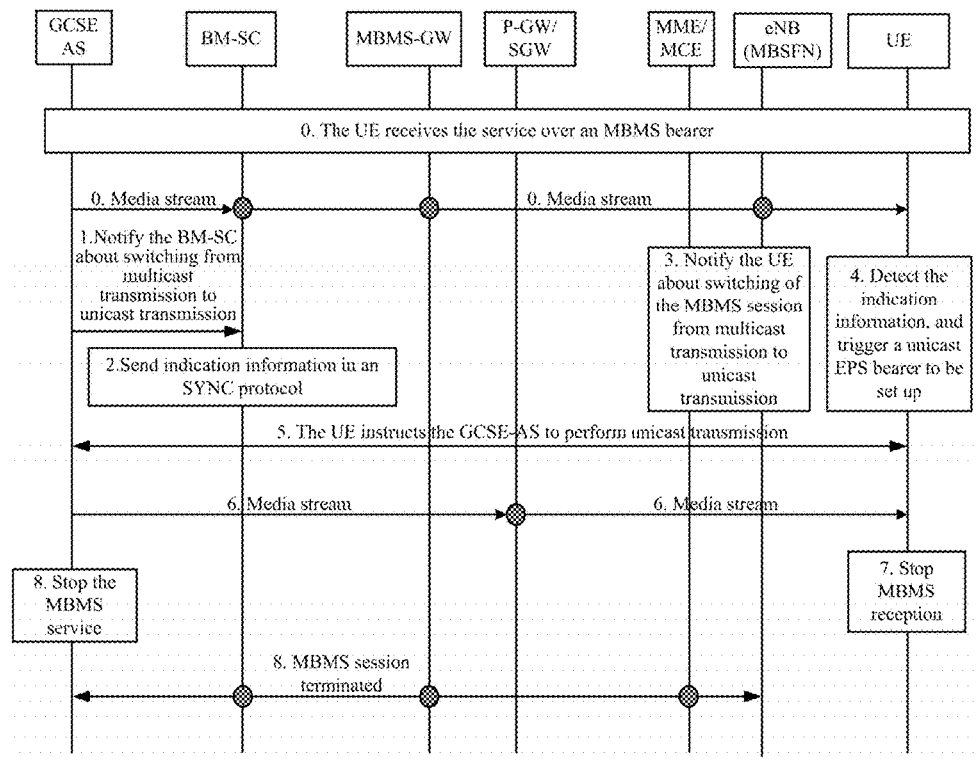
FIG. 4 is a schematic flow chart according to a first embodiment of the application.

In a first embodiment, the BM-SC sends an MBMS session multicast/unicast transmission switching message in a user plane SYNC protocol mechanism, and FIG. 4 illustrates a particular flow thereof including the following operations:

In the operation 0, the UE receives a group communication service over an MBMS bearer, where the UE can be in the idle state or the connected state.

In the operation 1, the GCSE-AS notifies the BM-SC via the GC2 interface that the GCSE-AS is going to switch the group communication service from multicast transmission to unicast transmission.

In the operation 2, the BM-SC indicates to the eNB in SYNC information of the enhanced user plane SYNC protocol (e.g., new PDU TYPE=4) that the GCSE-AS is going to switch an MBMS session from multicast transmission to unicast transmission.

In the operation 3, the eNB determines that the GCSE-AS is going to switch the MBMS session from multicast transmission to unicast transmission, upon reception of a data packet carrying the SYNC information, and then the eNB will notify the UE that the GCSE-AS is going to switch the MBMS session from multicast transmission to unicast transmission.

Particularly the eNB can notify the UE in any one of the first scheme to the fourth scheme above.

In the operation 4, the UE triggers a procedure of setting up a unicast EPS bearer for unicast transmission, upon reception of indication information sent by the eNB to indicate that the GCSE-AS is going to going to switch the MBMS session from multicast transmission to unicast transmission.

In the operation 5, the UE instructs directly the GCSE-AS to perform unicast transmission.

In the operation 6, the GCSE-AS transmits the group communication service over the unicast EPS bearer which has been set up by the UE, upon reception of the instruction of the UE.

In the operation 7, the UE stops the MBMS service from being received, that is, the UE stops the group communication service from being received in the multicast mode.

In the operation 8, the GCSE-AS stops the group communication service from being MBMS transmitted, that is, the GCSE-AS stops the group communication service from being transmitted to the UE in the multicast mode.

Figure 5:
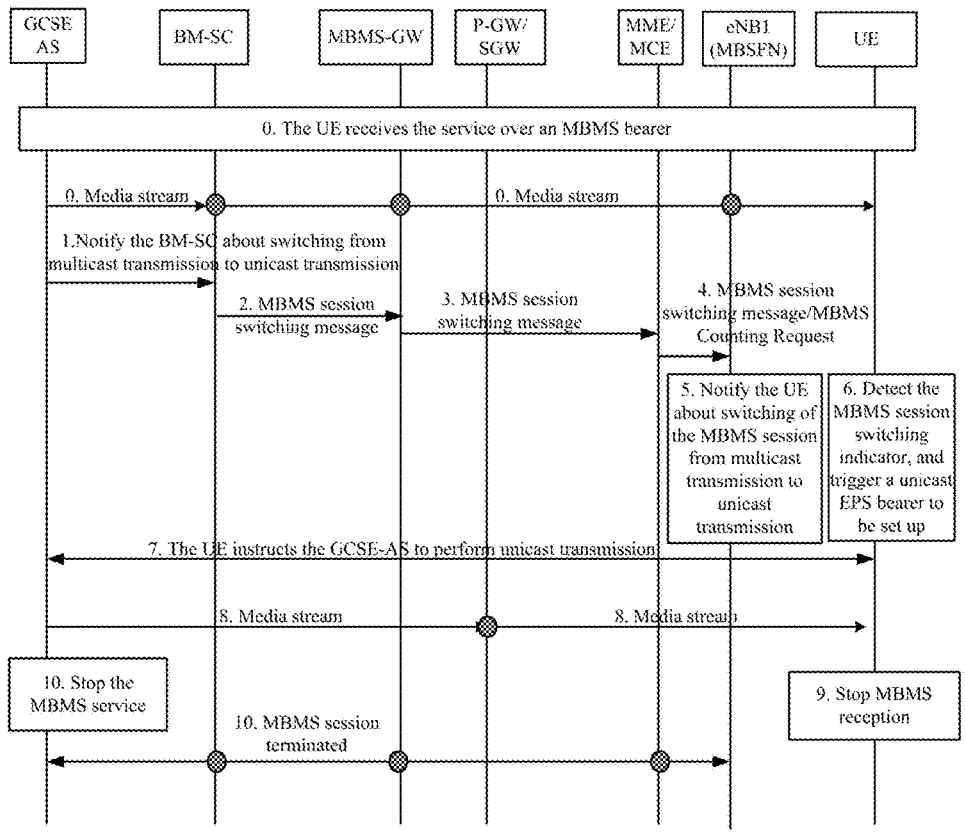
FIG. 5 is a schematic flow chart according to a second embodiment of the application.

In a second embodiment, the BM-SC sends an MBMS session multicast/unicast transmission switching message in a control plane mechanism, and FIG. 5 illustrates a particular flow thereof including the following operations:

In the operation 0, the UE receives a group communication service over an MBMS bearer, where the UE can be in the idle state or the connected state.

In the operation 1, the GCSE-AS notifies the BM-SC via the GC2 interface that the GCSE-AS is going to switch the group communication service from multicast transmission to unicast transmission.

In the operation 2, the BM-SC sends an MBMS session switching message to the MBMS-GW in a control plane mechanism to notify the MBMS-GW that the MBMS service needs to be switched from multicast transmission to unicast transmission.

Here the MBMS session switching message can be a new message or an enhanced existing MBMS Session Update message (that is, adding indication information to the message).

In the operation 3, the MBMS-GW forwards the MBMS session switching message or the MBMS Session Update message to the MME to notify the MME that the MBMS service needs to be switched from multicast transmission to unicast transmission; and furthermore the MME forwards the MBMS session switching message or the MBMS Session Update message to the MCE.

In the operation 4, the MCE forwards the MBMS session switching message or the MBMS Session Update message or an enhanced existing MBMS Counting Request message (that is, adding indication information to the message) to the eNB to notify the eNB that the MBMS service needs to be switched from multicast transmission to unicast transmission.

In the operation 5, the eNB notifies the UE that the MBMS service needs to be switched from multicast transmission to unicast transmission, upon reception of the indication information. Further, Particularly the eNB can notify the UE in any one of the first scheme to the fourth scheme above.

In the operation 6, the UE triggers a procedure of setting up a unicast EPS bearer for unicast transmission, upon reception of the indication information sent by the eNB to indicate that the GCSE-AS is going to going to switch the MBMS session from multicast transmission to unicast transmission.

In the operation 7, the UE instructs the GCSE-AS to perform unicast transmission.

In the operation 8, the GCSE-AS thereafter transmits the group communication service over the unicast EPS bearer.

In the operation 9, the UE stops the MBMS service from being received.

In the operation 10, the GCSE-AS stops the group communication service from being MBMS transmitted.

The processing flows of the methods above can be performed in software program which can be stored in a storage medium, where the stored software program is configured to perform the operations in the methods above upon being invoked.

Based upon the same inventive idea, an embodiment of the application further provides a Group Communication Service Enabler Application Server (GCSE AS), and since the GCSE-AS addresses the problem under a similar principle to the method at the network side for maintaining continuity of a group communication service, as illustrated in FIG. 2 above, reference can be made to the implementation of the method for an implementation of the GCSE-AS, so a repeated description thereof will be omitted here.

Figure 6:
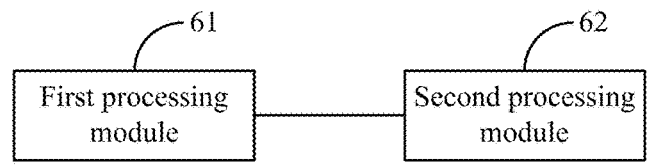
FIG. 6 is a schematic structural diagram of a GCSE-AS according to an embodiment of the application.

As illustrated in FIG. 6, an embodiment of the application provides a Group Communication Service Enabler Application Server (GCSE AS) including:

A first processing module 61 is configured to notify a terminal served by the GCSE-AS that the GCSE-AS is going to switch a group communication service from multicast transmission to unicast transmission, upon determining that the group communication service needs to be switched from multicast transmission to unicast transmission; and A second processing module 62 is configured to transmit the group communication service over a unicast bearer for unicast transmission, which has been set up by a terminal, and to stop the group communication service from being transmitted in the multicast mode, upon reception of a first notification message sent by the terminal.

In the embodiment of the application, the order in which the second processing module 62 firstly transmits the group communication service in the unicast mode, and then stops the group communication service from being transmitted in the multicast mode, or vice versa will not be limited. Particularly the second processing module 62 can firstly transmit the group communication service over the unicast bearer, and then stop the group communication service from being transmitted in the multicast mode, or can firstly stop the group communication service from being transmitted in the multicast mode, and then transmit the group communication service over the unicast bearer, upon reception of the first notification message sent by the terminal.

In the GCSE-AS according to the embodiment of the application, when the GCSE-AS switches the group communication service from multicast transmission to unicast transmission, the terminal has set up the unicast bearer for unicast transmission, thus guaranteeing continuity of the group communication service without modifying the existing network architecture.

In an implementation, the GCSE-AS can notify the terminal that the GCSE-AS is going to switch the group communication service from multicast transmission to unicast transmission, in different manners dependent upon different current states of the terminal, particularly as follows:

I. The terminal is in the idle state;

Particularly the first processing module 61 is configured to send a second notification message to a BM-SC via a GC2 interface, where the second notification message is configured to notify the BM-SC that the GCSE-AS is going to switch the group communication service from multicast transmission to unicast transmission.

II. The terminal is in the connected state.

In a preferred implementation, the first processing module 61 can notify the terminal that the GCSE-AS is going to switch the group communication service from multicast transmission to unicast transmission, as in the scheme where the terminal is in the idle state, and reference can be made to the description above for the terminal in the idle state for details thereof, so a repeated description thereof will be omitted here.

In another preferred implementation, the first processing module 61 sends a notification message directly to the terminal served by the GCSE-AS to notify the terminal that the GCSE-AS is going to switch the group communication service from multicast transmission to unicast transmission.

Based upon the same inventive idea, an embodiment of the application further provides a terminal, and since the terminal addresses the problem under a similar principle to the method at the terminal side for maintaining continuity of a group communication service, as illustrated in FIG. 3 above, reference can be made to the implementation of the method for an implementation of the terminal, so a repeated description thereof will be omitted here.

Figure 7:
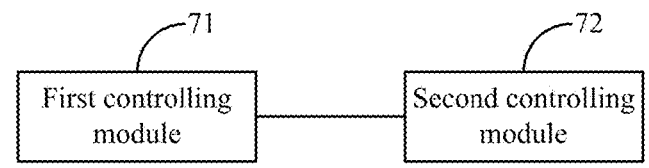
FIG. 7 is a schematic structural diagram of a terminal according to an embodiment of the application.

As illustrated in FIG. 7, an embodiment of the application provides a terminal including:

A first controlling module 71 is configured to trigger a procedure of setting up a unicast bearer for unicast transmission, upon reception of a notification that a GCSE-AS is going to switch a group communication service from multicast transmission to unicast transmission; and A second controlling module 72 is configured to send a first notification message to the GCSE-AS, and to stop the group communication service transmitted by the GCSE-AS from being received in the multicast mode, where the first notification message is configured to instruct the GCSE-AS to transmit the group communication service in the unicast mode.

In the embodiment of the application, when the GCSE-AS switches the group communication service from multicast transmission to unicast transmission, the terminal has set up the unicast bearer for unicast transmission, thus guaranteeing continuity of the group communication service.

In an implementation, the first controlling module 71 is configured:

To receive MSI sent by a base station serving the terminal, where the MSI carries indication information indicating that the GCSE-AS is going to switch the group communication service from multicast transmission to unicast transmission (reference can be made to the description in the first scheme above for details thereof);

Or

To receive an RRC message sent by the base station serving the terminal, over an MCCH, where the RRC message carries the indication information indicating that the GCSE-AS is going to switch the group communication service from multicast transmission to unicast transmission (reference can be made to the description in the second scheme above for details thereof);

Or

To receive an MBMS Counting Request message sent by the base station serving the terminal, over an MCCH, where the MBMS Counting Request message carries the indication information indicating that the GCSE-AS is going to switch the group communication service from multicast transmission to unicast transmission (reference can be made to the description in the third scheme above for details thereof);

Or

To receive an SIB sent by the base station serving the terminal, over an MCCH, where the SIB carries the indication information indicating that the GCSE-AS is going to switch the group communication service from multicast transmission to unicast transmission (reference can be made to the description in the fourth scheme above for details thereof).

Figure 8:
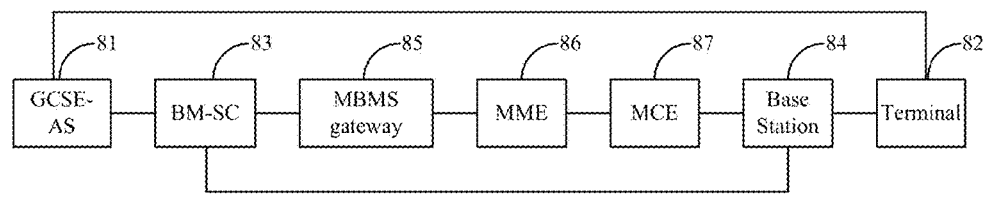
FIG. 8 is a schematic structural diagram of a communication system according to an embodiment of the application.

Based upon the same inventive idea, an embodiment of the application further provides a communication system, and as illustrated in FIG. 8, the system includes:

A GCSE-AS 81 is configured to notify a terminal served by the GCSE-AS that the GCSE-AS is going to switch a group communication service from multicast transmission to unicast transmission, upon determining that the group communication service needs to be switched from multicast transmission to unicast transmission; and to transmit the group communication service over a unicast bearer for unicast transmission, which has been set up by a terminal, and to stop the group communication service from being transmitted in the multicast mode, upon reception of a first notification message sent by the terminal; and The terminal 82 is configured to trigger a procedure of setting up the unicast bearer for unicast transmission, upon reception of the notification that the GCSE-AS is going to switch the group communication service from multicast transmission to unicast transmission; and to send a first notification message to the GCSE-AS, and to stop the group communication service transmitted by the GCSE-AS from being received in the multicast mode, where the first notification message is configured to instruct the GCSE-AS to transmit the group communication service in the unicast mode.

In a preferred implementation, the system further includes a BM-SC 83 and a base station 84, where:

The GCSE-AS 81 is configured to send a second notification message to the BM-SC via a GC2 interface, where the second notification message is configured to notify the BM-SC that the GCSE-AS is going to switch the group communication service from multicast transmission to unicast transmission;

The BM-SC 83 is configured to send data carrying SYNC information to the base station upon reception of the second notification message, where the SYNC information carries indication information indicating that the GCSE-AS is going to switch the group communication service from multicast transmission to unicast transmission; and The base station 84 is configured to notify the terminal served by the base station that the GCSE-AS is going to switch the group communication service from multicast transmission to unicast transmission, upon reception of the data carrying the SYNC information.

In this approach, the BM-SC notifies the E-UTRAN side device that the GCSE-AS is going to switch the group communication service from multicast transmission to unicast transmission, in a user plane mechanism.

In another preferred implementation, the system further includes a BM-SC 83, an MBMS gateway 85, an MME 86, an MCE 87, and a base station 84, where:

The GCSE-AS 81 is configured to send a second notification message to the BM-SC via a GC2 interface, where the second notification message is configured to notify the BM-SC that the GCSE-AS is going to switch the group communication service from multicast transmission to unicast transmission;

The BM-SC 83 is configured to send a first MBMS session switching message to the MBMS gateway upon reception of the second notification message to notify the MBMS gateway that the GCSE-AS is going to switch the group communication service from multicast transmission to unicast transmission;

The MBMS gateway 85 is configured to send a second MBMS session switching message to the MME upon reception of the first MBMS session switching message to notify the MME that the GCSE-AS is going to switch the group communication service from multicast transmission to unicast transmission;

The MME 86 is configured to send a third MBMS session switching message to the MCE upon reception of the second MBMS session switching message to notify the MCE that the GCSE-AS is going to switch the group communication service from multicast transmission to unicast transmission;

The MCE 87 is configured to send a fourth MBMS session switching message to the base station upon reception of the third MBMS session switching message to notify the base station that the GCSE-AS is going to switch the group communication service from multicast transmission to unicast transmission; and The base station 84 is configured to notify the terminal served by the base station that the GCSE-AS is going to switch the group communication service from multicast transmission to unicast transmission, upon reception of the fourth MBMS session switching message.

In this approach, preferably the first MBMS session switching message is an MBMS Session Update message carrying indication information indicating that the GCSE-AS is going to switch the group communication service from multicast transmission to unicast transmission (reference can be made to the description of the method at the network side for details thereof, so a repeated description thereof will be omitted here);

The second MBMS session switching message is an MBMS Session Update message carrying the indication information indicating that the GCSE-AS is going to switch the group communication service from multicast transmission to unicast transmission (reference can be made to the description of the method at the network side for details thereof, so a repeated description thereof will be omitted here);

The third MBMS session switching message is an MBMS Session Update message carrying the indication information indicating that the GCSE-AS is going to switch the group communication service from multicast transmission to unicast transmission (reference can be made to the description of the method at the network side for details thereof, so a repeated description thereof will be omitted here); and The fourth MBMS session switching message is an MBMS Session Update message carrying the indication information indicating that the GCSE-AS is going to switch the group communication service from multicast transmission to unicast transmission; or the fourth MBMS session switching is an MBMS Counting Request message carrying the indication information indicating the GCSE-AS is going to switch the group communication service from multicast transmission to unicast transmission (reference can be made to the description of the method at the network side for details thereof, so a repeated description thereof will be omitted here).

Further to the two preferred implementations above, the base station 84 is configured:

To notify the terminal that the GCSE-AS is going to switch the group communication service from multicast transmission to unicast transmission, in MSI carrying the indication information indicating that the GCSE-AS is going to switch the group communication service from multicast transmission to unicast transmission (reference can be made to the description of the first scheme above for details thereof); or To notify the terminal served by the base station that the GCSE-AS is going to switch the group communication service from multicast transmission to unicast transmission, over an MCCH in an RRC message carrying the indication information indicating that the GCSE-AS is going to switch the group communication service from multicast transmission to unicast transmission (reference can be made to the description of the second scheme above for details thereof); or To notify the terminal served by the base station that the GCSE-AS is going to switch the group communication service from multicast transmission to unicast transmission, over an MCCH in an MBMS Counting Request message carrying the indication information indicating that the GCSE-AS is going to switch the group communication service from multicast transmission to unicast transmission (reference can be made to the description of the third scheme above for details thereof); or To notify the terminal served by the base station that the GCSE-AS is going to switch the group communication service from multicast transmission to unicast transmission, in an SIB carrying the indication information indicating that the GCSE-AS is going to switch the group communication service from multicast transmission to unicast transmission (reference can be made to the description of the fourth scheme above for details thereof).

Structures of and processing by the respective entities in the communication system according to the embodiment of the application will be described below in terms of their preferred hardware structures.

Figure 9:
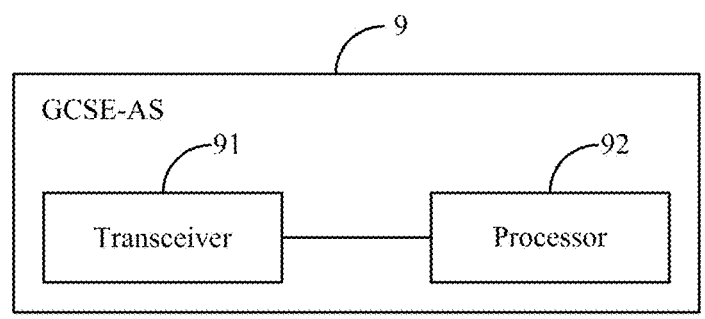
FIG. 9 is a schematic structural diagram of another GCSE-AS according to an embodiment of the application.

As illustrated in FIG. 9, a GCSE-AS 9 includes a transceiver 91, and at least one processor 92 connected with the transceiver 91, where:

The processor 92 is configured to trigger the transceiver 92 to notify a terminal served by the GCSE-AS that the GCSE-AS is going to switch a group communication service from multicast transmission to unicast transmission, when the GCSE-AS determines that the group communication service needs to be switched from multicast transmission to unicast transmission; and The transceiver 92 is configured to receive a first notification message sent by the terminal; and the processor 92 is further configured to transmit the group communication service over a unicast bearer for unicast transmission, which has been set up by a terminal, and to stop the group communication service from being transmitted in the multicast mode.

Furthermore the transceiver 91 is configured to send a second notification message to a BM-SC via a GC2 interface, where the second notification message is configured to notify the BM-SC that the GCSE-AS is going to switch the group communication service from multicast transmission to unicast transmission.

Figure 10:
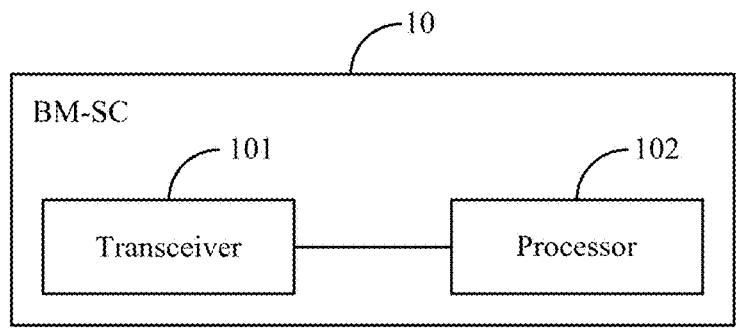
FIG. 10 is a schematic structural diagram of a BM-SC according to an embodiment of the application.

As illustrated in FIG. 10, a BM-SC 10 includes a transceiver 101, and at least one processor 102 connected with the transceiver 101, where:

The transceiver 101 is configured to receive a second notification message sent by a GCSE-AS; and The processor 102 is configured to determine from the second notification message that the GCSE-AS is going to switch a group communication service from multicast transmission to unicast transmission, and to trigger the transceiver 101 to notify an E-TURAN side device that the GCSE-AS is going to switch the group communication service from multicast transmission to unicast transmission, in a user plane mechanism or a control plane mechanism.

In a first approach, the transceiver 101 is configured to send data carrying SYNC information to a base station, where the SYNC information carriers indication information indicating the GCSE-AS is going to switch the group communication service from multicast transmission to unicast transmission, where reference can be made to the description of the first approach in the method.

In a second approach, the transceiver 101 is configured to send a first MBMS session switching message to an MBMS gateway to notify the MBMS gateway that the GCSE-AS is going to switch the group communication service from multicast transmission to unicast transmission.

In an implementation, the first MBMS session switching message can be new signaling or extended existing signaling.

Preferably the first MBMS session switching message is an MBMS Session Update message carrying indication information indicating that the GCSE-AS is going to switch the group communication service from multicast transmission to unicast transmission, that is, the BM-SC extends the existing MBMS Session Update message to notify the MBMS gateway that the GCSE-AS is going to switch the group communication service from multicast transmission to unicast transmission.

Figure 11:
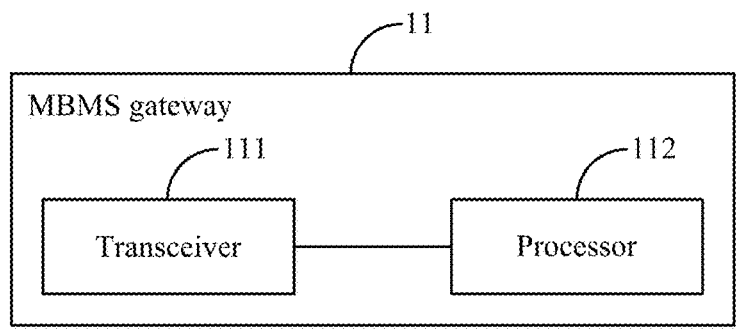
FIG. 11 is a schematic structural diagram of an MBMS gateway according to an embodiment of the application.

As illustrated in FIG. 11, an MBMS gateway 11 includes a transceiver 111, and at least one processor 112 connected with the transceiver 111, where:

The transceiver 111 is configured to receive a first MBMS session switching message sent by a BM-SC; and The processor 112 is configured to determine from the first MBMS session switching message that a GCSE-AS is going to switch a group communication service from multicast transmission to unicast transmission, and to trigger the transceiver 111 to send a second MBMS session switching message to an MME to notify the MME that the GCSE-AS is going to switch the group communication service from multicast transmission to unicast transmission.

In an implementation, the second MBMS session switching message can be new signaling or extended existing signaling.

Preferably the second MBMS session switching message is an MBMS Session Update message carrying indication information indicating that the GCSE-AS is going to switch the group communication service from multicast transmission to unicast transmission, that is, the MBMS gateway extends the existing MBMS Session Update message to notify the MME that the GCSE-AS is going to switch the group communication service from multicast transmission to unicast transmission.

Figure 12:
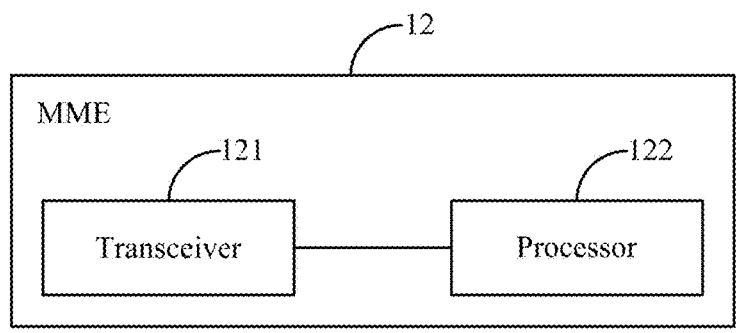
FIG. 12 is a schematic structural diagram of an MME according to an embodiment of the application.

As illustrated in FIG. 12, an MME 12 includes a transceiver 121, and at least one processor 122 connected with the transceiver 121, where:

The transceiver 121 is configured to receive a second MBMS session switching message sent by an MBMS gateway; and The processor 122 is configured to determine from the second MBMS session switching message that a GCSE-AS is going to switch a group communication service from multicast transmission to unicast transmission, and to trigger the transceiver 121 to send a third MBMS session switching message to an MCE to notify the MCE that the GCSE-AS is going to switch the group communication service from multicast transmission to unicast transmission.

In an implementation, the third MBMS session switching message can be new signaling or extended existing signaling.

Preferably the third MBMS session switching message is an MBMS Session Update message carrying indication information indicating that the GCSE-AS is going to switch the group communication service from multicast transmission to unicast transmission, that is, the MME extends the existing MBMS Session Update message to notify the MCE that the GCSE-AS is going to switch the group communication service from multicast transmission to unicast transmission.

Figure 13:
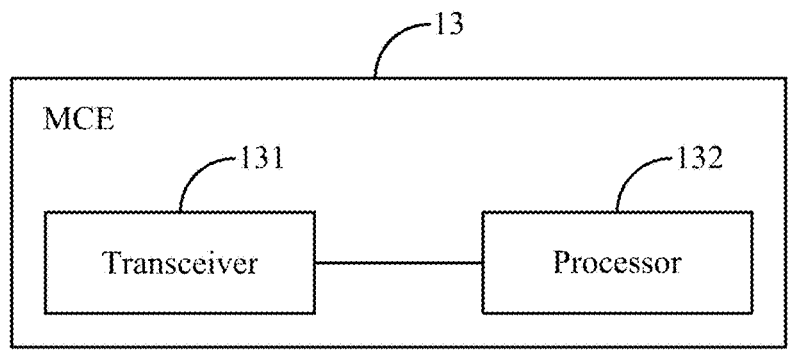
FIG. 13 is a schematic structural diagram of an MCE according to an embodiment of the application.

As illustrated in FIG. 13, an MCE 13 includes a transceiver 131, and at least one processor 132 connected with the transceiver 131, where:

The transceiver 131 is configured to receive a third MBMS session switching message sent by an MME; and The processor 132 is configured to determine from the third MBMS session switching message that a GCSE-AS is going to switch a group communication service from multicast transmission to unicast transmission, and to trigger the transceiver 131 to send a fourth MBMS session switching message to a base station to notify the base station that the GCSE-AS is going to switch the group communication service from multicast transmission to unicast transmission.

In an implementation, the fourth MBMS session switching message can be new signaling or extended existing signaling.

Preferably the fourth MBMS session switching message is an MBMS Session Update message carrying indication information indicating that the GCSE-AS is going to switch the group communication service from multicast transmission to unicast transmission, that is, the MCE extends the existing MBMS Session Update message to notify the base station that the GCSE-AS is going to switch the group communication service from multicast transmission to unicast transmission.

In another preferred implementation, the fourth MBMS session switching message is an MBMS Counting Request message carrying the indication information indicating that the GCSE-AS is going to switch the group communication service from multicast transmission to unicast transmission, that is, the MCE extends the MBMS Counting Request message to notify the base station that the GCSE-AS is going to switch the group communication service from multicast transmission to unicast transmission.

Figure 14:
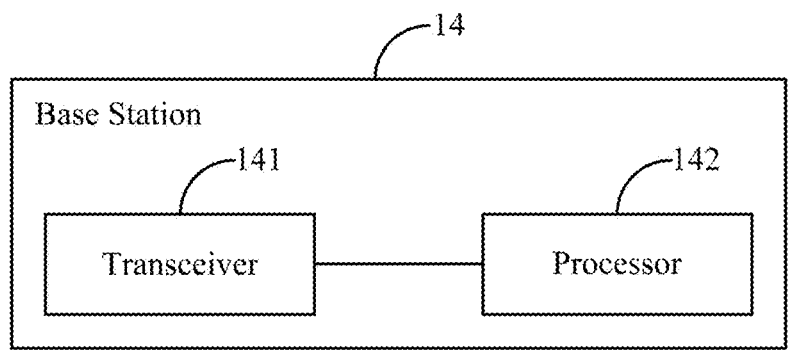
FIG. 14 is a schematic structural diagram of a base station according to an embodiment of the application.

As illustrated in FIG. 14, a base station 14 includes a transceiver 141, and at least one processor 142 connected with the transceiver 141, where:

I. If the BM-SC notifies the E-UTRAN side device that the GCSE-AS is going to switch a group communication service from multicast transmission to unicast transmission, in the user plane mechanism upon reception of the second notification message, then:

The transceiver 141 is configured to receive data carrying SYNC information sent by the BM-SC; and The processor 142 is configured to determine from the data carrying the SYNC information that the GCSE-AS is going to switch the group communication service from multicast transmission to unicast transmission, and to trigger the transceiver 141 to notify the terminal served by the base station that the GCSE-AS is going to switch the group communication service from multicast transmission to unicast transmission.

Particularly the transceiver 141 can notify the terminal served by the base station that the GCSE-AS is going to switch the group communication service from multicast transmission to unicast transmission, in any one of the first scheme to the fourth scheme above, and reference can be made to the description of the method for details thereof.

II. If the BM-SC notifies the E-UTRAN side device that the GCSE-AS is going to switch a group communication service from multicast transmission to unicast transmission, in the control plane mechanism upon reception of the second notification message, then:

The transceiver 141 is configured to receive a fourth MBMS session switching message sent by the MCE; and The processor 142 is configured to determine from the fourth MBMS session switching message that the GCSE-AS is going to switch the group communication service from multicast transmission to unicast transmission, and to trigger the transceiver 141 to notify the terminal served by the base station that the GCSE-AS is going to switch the group communication service from multicast transmission to unicast transmission.

Particularly the transceiver 141 can notify the terminal served by the base station that the GCSE-AS is going to switch the group communication service from multicast transmission to unicast transmission, in any one of the first scheme to the fourth scheme above, and reference can be made to the description of the method for details thereof.

Figure 15:
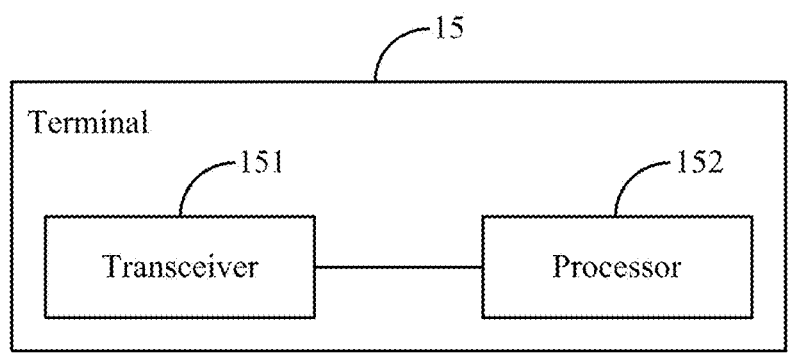
FIG. 15 is a schematic structural diagram of another terminal according to an embodiment of the application.

As illustrated in FIG. 15, a terminal 15 includes a transceiver 151, and at least one processor 152 connected with the transceiver 151, where:

The transceiver 151 is configured to receive a notification that a GCSE-AS is going to switch a group communication service from multicast transmission to unicast transmission; and The processor 152 is configured to trigger a procedure of setting up a unicast bearer for unicast transmission, to trigger the transceiver 151 to send a first notification message to the GCSE-AS, and to stop the group communication service sent by the GCSE-AS from being received in the multicast mode, where the first notification message is configured to instruct the GCSE-AS to transmit the group communication service in the unicast mode.

Particularly the transceiver 151 is configured:

To receive MSI sent by a base station serving the terminal, where the MSI carries indication information indicating that the GCSE-AS is going to switch the group communication service from multicast transmission to unicast transmission (reference can be made to the description in the first scheme above for details thereof); or To receive an RRC message sent by the base station serving the terminal, over an MCCH, where the RRC message carries the indication information indicating that the GCSE-AS is going to switch the group communication service from multicast transmission to unicast transmission (reference can be made to the description in the second scheme above for details thereof); or To receive an MBMS Counting Request message sent by the base station serving the terminal, over an MCCH, where the MBMS Counting Request message carries the indication information indicating that the GCSE-AS is going to switch the group communication service from multicast transmission to unicast transmission (reference can be made to the description in the third scheme above for details thereof); or To receive an SIB sent by the base station serving the terminal, over an MCCH, where the SIB carries the indication information indicating that the GCSE-AS is going to switch the group communication service from multicast transmission to unicast transmission (reference can be made to the description in the fourth scheme above for details thereof).

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, a CD-ROM, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the application have been described, those skilled in the art benefiting from the underlying inventive concept can make additional modifications and variations to these embodiments. Therefore the appended claims are intended to be construed as encompassing the preferred embodiments and all the modifications and variations coming into the scope of the application.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A method for maintaining continuity of a group communication service, the method comprising:
   notifying, by a Group Communication Service Enabler Application Server, GCSE-AS, a terminal served by the GCSE-AS that the GCSE-AS is going to switch the group communication service from multicast transmission to unicast transmission, upon determining that the group communication service needs to be switched from multicast transmission to unicast transmission; and
   transmitting, by the GCSE-AS, the group communication service over a unicast bearer for unicast transmission, which has been set up by the terminal, and stopping the group communication service from being transmitted in multicast mode, upon reception of a first notification message sent by the terminal;
   wherein notifying, by the GCSE-AS, the terminal that the GCSE-AS is going to switch the group communication service from multicast transmission to unicast transmission comprises:
   sending, by the GCSE-AS, a second notification message to a Broadcast Multicast-Service Center, BM-SC, via a GC2 interface, wherein the second notification message is configured to notify the BM-SC that the GCSE-AS is going to switch the group communication service from multicast transmission to unicast transmission.

2. The method according to claim 1, wherein the method further comprises:
   sending, by the BM-SC, data carrying synchronous, SYNC, information to a base station upon reception of the second notification message, wherein the SYNC information carriers indication information indicating the GCSE-AS is going to switch the group communication service from multicast transmission to unicast transmission; or
   sending, by the BM-SC, a first Multimedia Broadcast Multicast Service, MBMS, session switching message to an MBMS gateway upon reception of the second notification message to notify the MBMS gateway that the GCSE-AS is going to switch the group communication service from multicast transmission to unicast transmission;
   wherein the first MBMS session switching message is an MBMS Session Update message carrying the indication information indicating the GCSE-AS is going to switch the group communication service from multicast transmission to unicast transmission.

3. The method according to claim 2, wherein the method further comprises:
   sending, by the MBMS gateway, a second MBMS session switching message to a Mobility Management Entity, MME, upon reception of the first MBMS session switching message to notify the MME that the GCSE-AS is going to switch the group communication service from multicast transmission to unicast transmission;
   wherein the second MBMS session switching message is an MBMS Session Update message carrying the indication information indicating the GCSE-AS is going to switch the group communication service from multicast transmission to unicast transmission.

4. The method according to claim 3, wherein the method further comprises:
   sending, by the MME, a third MBMS session switching message to a Multi-cell/Multicast Coordination Entity, MCE, upon reception of the second MBMS session switching message to notify the MCE that the GCSE-AS is going to switch the group communication service from multicast transmission to unicast transmission;
   wherein the third MBMS session switching message is an MBMS Session Update message carrying the indication information indicating the GCSE-AS is going to switch the group communication service from multicast transmission to unicast transmission.

5. The method according to claim 4, wherein the method further comprises:
sending, by the MCE, a fourth MBMS session switching message to the base station upon reception of the third MBMS session switching message to notify the base station that the GCSE-AS is going to switch the group communication service from multicast transmission to unicast transmission;
wherein the fourth MBMS session switching message is an MBMS Session Update message carrying the indication information indicating the GCSE-AS is going to switch the group communication service from multicast transmission to unicast transmission; or
the fourth MBMS session switching message is an MBMS Counting Request message carrying the indication information indicating the GCSE-AS is going to switch the group communication service from multicast transmission to unicast transmission.

6. The method according to claim 2, wherein the method further comprises:
notifying, by the base station, the terminal served by the base station that the GCSE-AS is going to switch the group communication service from multicast transmission to unicast transmission, upon reception of the data carrying the SYNC information, or of the fourth MBMS session switching message.

7. The method according to claim 6, wherein notifying, by the base station, the terminal that the GCSE-AS is going to switch the group communication service from multicast transmission to unicast transmission comprises:
notifying, by the base station, the terminal that the GCSE-AS is going to switch the group communication service from multicast transmission to unicast transmission, in Multicast channel Scheduling Information, MSI, carrying the indication information indicating that the GCSE-AS is going to switch the group communication service from multicast transmission to unicast transmission; or
notifying, by the base station, the terminal served by the base station that the GCSE-AS is going to switch the group communication service from multicast transmission to unicast transmission, over a Multicast Control Channel, MCCH, in a Radio Resource Control, RRC, message carrying the indication information indicating that the GCSE-AS is going to switch the group communication service from multicast transmission to unicast transmission; or
notifying, by the base station, notifies the terminal served by the base station that the GCSE-AS is going to switch the group communication service from multicast transmission to unicast transmission, over the MCCH in an MBMS Counting Request message carrying the indication information indicating that the GCSE-AS is going to switch the group communication service from multicast transmission to unicast transmission; or
notifying, by the base station, the terminal that the GCSE-AS is going to switch the group communication service from multicast transmission to unicast transmission, by broadcasting a System Information Block, SIB, carrying the indication information indicating that the GCSE-AS is going to switch the group communication service from multicast transmission to unicast transmission;
wherein the SIB is SIB13 or SIB15.

8. A method for maintaining continuity of a group communication service, the method comprising:
triggering, by a terminal, a procedure of setting up a unicast bearer for unicast transmission, upon reception of a notification that a Group Communication Service Enabler Application Server, GCSE-AS, is going to switch the group communication service from multicast transmission to unicast transmission; and
sending, by the terminal, a first notification message to the GCSE-AS, and stopping the group communication service transmitted by the GCSE-AS from being received in multicast mode, wherein the first notification message is configured to instruct the GCSE-AS to transmit the group communication service in unicast mode;
wherein the GCSE-AS notifies the terminal that the GCSE-AS is going to switch the group communication service from multicast transmission to unicast transmission by sending a second notification message to a Broadcast Multicast Service Center, BM-SC, via a GC2 interface, and the second notification message is configured to notify the BM-SC that the GCSE-AS is going to switch the group communication service from multicast transmission to unicast transmission.

9. The method according to claim 8, wherein receiving, by the terminal, the notification that the GCSE-AS is going to switch the group communication service from multicast transmission to unicast transmission comprises:
receiving, by the terminal, Multicast channel Scheduling Information, MSI, sent by a base station serving the terminal, wherein the MSI carries indication information indicating that the GCSE-AS is going to switch the group communication service from multicast transmission to unicast transmission; or
receiving, by the terminal, a Radio Resource Control, RRC, message sent by the base station serving the terminal, over a Multicast Control Channel, MCCH, wherein the RRC message carries indication information indicating that the GCSE-AS is going to switch the group communication service from multicast transmission to unicast transmission; or
receiving, by the terminal, an Multimedia Broadcast Multicast Service, MBMS, Counting Request message sent by the base station serving the terminal, over the MCCH, wherein the MBMS Counting Request message carries the indication information indicating that the GCSE-AS is going to switch the group communication service from multicast transmission to unicast transmission; or
receiving, by the terminal, an SIB sent by the base station serving the terminal, over the MCCH, wherein the SIB carries the indication information indicating that the GCSE-AS is going to switch the group communication service from multicast transmission to unicast transmission.

10. The method according to claim 9, wherein the SIB is SIB13 or SIB15.

11. A Group Communication Service Enabler Application Server, GCSE AS, comprising:
a transceiver;
a processor; and
a memory storing at least one instruction, wherein the processor is configured to execute the at least one instruction to:
control the transceiver to notify a terminal served by the GCSE-AS that the GCSE-AS is going to switch a group communication service from multicast transmission to unicast transmission, upon determining that the group communication service needs to be switched from multicast transmission to unicast transmission; and control the transceiver to transmit the group communication service over a unicast bearer for unicast transmission, which has been set up by the terminal, and stop the group communication service from being transmitted in multicast mode, upon reception of a first notification message sent by the terminal;

wherein the processor is further configured to execute the at least one instruction to control the transceiver to send a second notification message to a Broadcast Multicast-Service Center, BM-SC, via a GC2 interface, and the second notification message is configured to notify the BM-SC that the GCSE-AS is going to switch the group communication service from multicast transmission to unicast transmission.

12. A terminal, comprising:
a transceiver;
a processor; and
a memory storing at least one instruction, wherein the processor is configured to execute the at least one instruction to:
trigger a procedure of setting up a unicast bearer for unicast transmission, upon reception of a notification that a GCSE-AS is going to switch a group communication service from multicast transmission to unicast transmission; and
control the transceiver to send a first notification message to the GCSE-AS, and stop the group communication service from being received in the multicast mode, wherein the first notification message is configured to instruct the GCSE-AS to transmit the group communication service in unicast mode;
wherein the GCSE-AS notifies the terminal that the GCSE-AS is going to switch the group communication service from multicast transmission to unicast transmission by sending a second notification message to a Broadcast Multicast-Service Center, BM-SC, via a GC2 interface, and the second notification message is configured to notify the BM-SC that the GCSE-AS is going to switch the group communication service from multicast transmission to unicast transmission.

13. The terminal according to claim 12, wherein the processor is configured to execute the at least one instruction to:
control the transceiver to receive Multicast channel Scheduling Information, MSI, sent by a base station serving the terminal, wherein the MSI carries indication information indicating that the GCSE-AS is going to switch the group communication service from multicast transmission to unicast transmission; or
control the transceiver to receive a Radio Resource Control, RRC, message sent by the base station serving the terminal, over a Multicast Control Channel, MCCH, wherein the RRC message carries indication information indicating that the GCSE-AS is going to switch the group communication service from multicast transmission to unicast transmission; or
control the transceiver to receive a Multimedia Broadcast Multicast Service, MBMS, Counting Request message sent by the base station serving the terminal, over a Multicast Control Channel, MCCH, wherein the MBMS Counting Request message carries the indication information indicating that the GCSE-AS is going to switch the group communication service from multicast transmission to unicast transmission; or control the transceiver to receive an SIB sent by the base station serving the terminal, over the MCCH, wherein the SIB carries the indication information indicating that the GCSE-AS is going to switch the group communication service from multicast transmission to unicast transmission.

14. A communication system, comprising:
a Group Communication Service Enabler Application Server, GCSE AS, configured to notify a terminal served by the GCSE-AS that the GCSE-AS is going to switch a group communication service from multicast transmission to unicast transmission, upon determining that the group communication service needs to be switched from multicast transmission to unicast transmission; and to transmit the group communication service over a unicast bearer for unicast transmission, which has been set up by the terminal, and to stop the group communication service from being transmitted in multicast mode, upon reception of a first notification message sent by the terminal; and
the terminal configured to trigger a procedure of setting up the unicast bearer for unicast transmission, upon reception of the notification that the GCSE-AS is going to switch the group communication service from multicast transmission to unicast transmission; and to send a first notification message to the GCSE-AS, and to stop the group communication service transmitted by the GCSE-AS from being received in multicast mode, wherein the first notification message is configured to instruct the GCSE-AS to transmit the group communication service in unicast mode;
wherein:
the system further comprises a Broadcast Multicast-Service Center, BM-SC, and a base station;
the GCSE-AS is further configured to send a second notification message to the BM-SC via a GC2 interface; and
the second notification message is configured to notify the BM-SC that the GCSE-AS is going to switch the group communication service from multicast transmission to unicast transmission.

15. The system according to claim 14, wherein:
the BM-SC is configured to send data carrying SYNC information to the base station upon reception of the second notification message, wherein the SYNC information carries indication information indicating that the GCSE-AS is going to switch the group communication service from multicast transmission to unicast transmission; and
the base station is configured to notify the terminal served by the base station that the GCSE-AS is going to switch the group communication service from multicast transmission to unicast transmission, upon reception of the data carrying the SYNC information.

16. The system according to claim 14,
the BM-SC is configured to send a first MBMS session switching message to the MBMS gateway upon reception of the second notification message to notify the MBMS gateway that the GCSE-AS is going to switch the group communication service from multicast transmission to unicast transmission;
the MBMS gateway is configured to send a second MBMS session switching message to the MME upon reception of the first MBMS session switching message to notify the MME that the GCSE-AS is going to switch the group communication service from multicast transmission to unicast transmission;

the MME is configured to send a third MBMS session switching message to the MCE upon reception of the second MBMS session switching message to notify the MCE that the GCSE-AS is going to switch the group communication service from multicast transmission to unicast transmission;

the MCE is configured to send a fourth MBMS session switching message to the base station upon reception of the third MBMS session switching message to notify the base station that the GCSE-AS is going to switch the group communication service from multicast transmission to unicast transmission; and the base station is configured to notify the terminal served by the base station that the GCSE-AS is going to switch the group communication service from multicast transmission to unicast transmission, upon reception of the fourth MBMS session switching message.

17. The system according to claim 16, wherein:

the first MBMS session switching message is an MBMS Session Update message carrying indication information indicating that the GCSE-AS is going to switch the group communication service from multicast transmission to unicast transmission;

the second MBMS session switching message is an MBMS Session Update message carrying the indication information indicating that the GCSE-AS is going to switch the group communication service from multicast transmission to unicast transmission;

the third MBMS session switching message is an MBMS Session Update message carrying the indication information indicating that the GCSE-AS is going to switch the group communication service from multicast transmission to unicast transmission; and the fourth MBMS session switching message is an MBMS Session Update message carrying the indication information indicating that the GCSE-AS is going to switch the group communication service from multicast transmission to unicast transmission; or the fourth MBMS session switching is an MBMS Counting Request message carrying the indication information indicating the GCSE-AS is going to switch the group communication service from multicast transmission to unicast transmission.

18. The system according to claim 15, wherein the base station is configured:

to notify the terminal that the GCSE-AS is going to switch the group communication service from multicast transmission to unicast transmission, in MSI carrying the indication information indicating that the GCSE-AS is going to switch the group communication service from multicast transmission to unicast transmission; or to notify the terminal served by the base station that the GCSE-AS is going to switch the group communication service from multicast transmission to unicast transmission, over a Multicast Control Channel, MCCH, in a Radio Resource Control, RRC, message carrying the indication information indicating that the GCSE-AS is going to switch the group communication service from multicast transmission to unicast transmission; or to notify the terminal served by the base station that the GCSE-AS is going to switch the group communication service from multicast transmission to unicast transmission, over the MCCH in an MBMS Counting Request message carrying the indication information indicating that the GCSE-AS is going to switch the group communication service from multicast transmission to unicast transmission; or to notify the terminal served by the base station that the GCSE-AS is going to switch the group communication service from multicast transmission to unicast transmission, in an SIB carrying the indication information indicating that the GCSE-AS is going to switch the group communication service from multicast transmission to unicast transmission.

* * * * *